United States Patent
Tanaka

(10) Patent No.: US 7,151,247 B2
(45) Date of Patent: Dec. 19, 2006

(54) MOBILE MEASUREMENT SYSTEM OF PHOTOENVIRONMENT

(75) Inventor: Takafumi Tanaka, Owari-asahi (JP)

(73) Assignee: National University Corporation Nagoya University, Nagoya (JP)

( * ) Notice: Subject to any disclaimer, the term of this patent is extended or adjusted under 35 U.S.C. 154(b) by 108 days.

(21) Appl. No.: 10/882,300

(22) Filed: Jul. 2, 2004

(65) Prior Publication Data
US 2005/0030526 A1 Feb. 10, 2005

(30) Foreign Application Priority Data
Jul. 8, 2003 (JP) .............................. 2003-193398

(51) Int. Cl.
*H01J 40/14* (2006.01)
*G01D 7/00* (2006.01)
*G01L 1/24* (2006.01)

(52) U.S. Cl. .............. 250/215; 250/231.1; 73/862.041; 280/47.31

(58) Field of Classification Search ................ 250/215, 250/231.1; 356/221, 222; 242/615.2; 280/47.3, 280/47.31; 405/154.1, 174, 177; 73/862.041, 73/862.042, 862.043
See application file for complete search history.

(56) References Cited

U.S. PATENT DOCUMENTS 6,460,260 B1 * 10/2002 Alster ........................ 33/227
7,032,458 B1 * 4/2006 Tanaka ......................... 73/800
2005/0028611 A1 * 2/2005 Tanaka ................... 73/862.041
2005/0029764 A1 * 2/2005 Tanaka ...................... 280/47.31
2005/0219517 A1 * 10/2005 Tanaka et al. ............... 356/221

FOREIGN PATENT DOCUMENTS

| JP | A 54-159278 | 12/1979 |
|---|---|---|
| JP | A 10-9951 | 1/1998 |
| JP | A 2000-71990 | 3/2000 |
| JP | A 2002-39858 | 2/2002 |

* cited by examiner

*Primary Examiner*—Stephone B. Allen
(74) *Attorney, Agent, or Firm*—Oliff & Berridge, PLC

(57) ABSTRACT

This invention relates to a mobile measurement system of photoenvironment comprises a measuring equipment 5 to measure photoenvironment and a barrow 4 for moving measurement which the equipment 5 is mounted. The measuring equipment 5 has one or more photosensor 5a–5c and a photodata recording device 7 that records photodata that is detected and output by the photosensors with the position and the direction of the detect of these sensors, the barrow 4 has a measurement position and direction calculating device 7 that calculates the position and the direction of detection of the photosensors 5a14 5c at the measurement in accordance with an information of self-contained navigation from an acceleration sensor 9 and a rotation angle sensor 10 that detects the acceleration and the rotation angle of the barrow respectively, and an information of moving distance from the wheel revolution sensor 8 and transmit the result of the calculation to the photodata recording device 7.

9 Claims, 2 Drawing Sheets

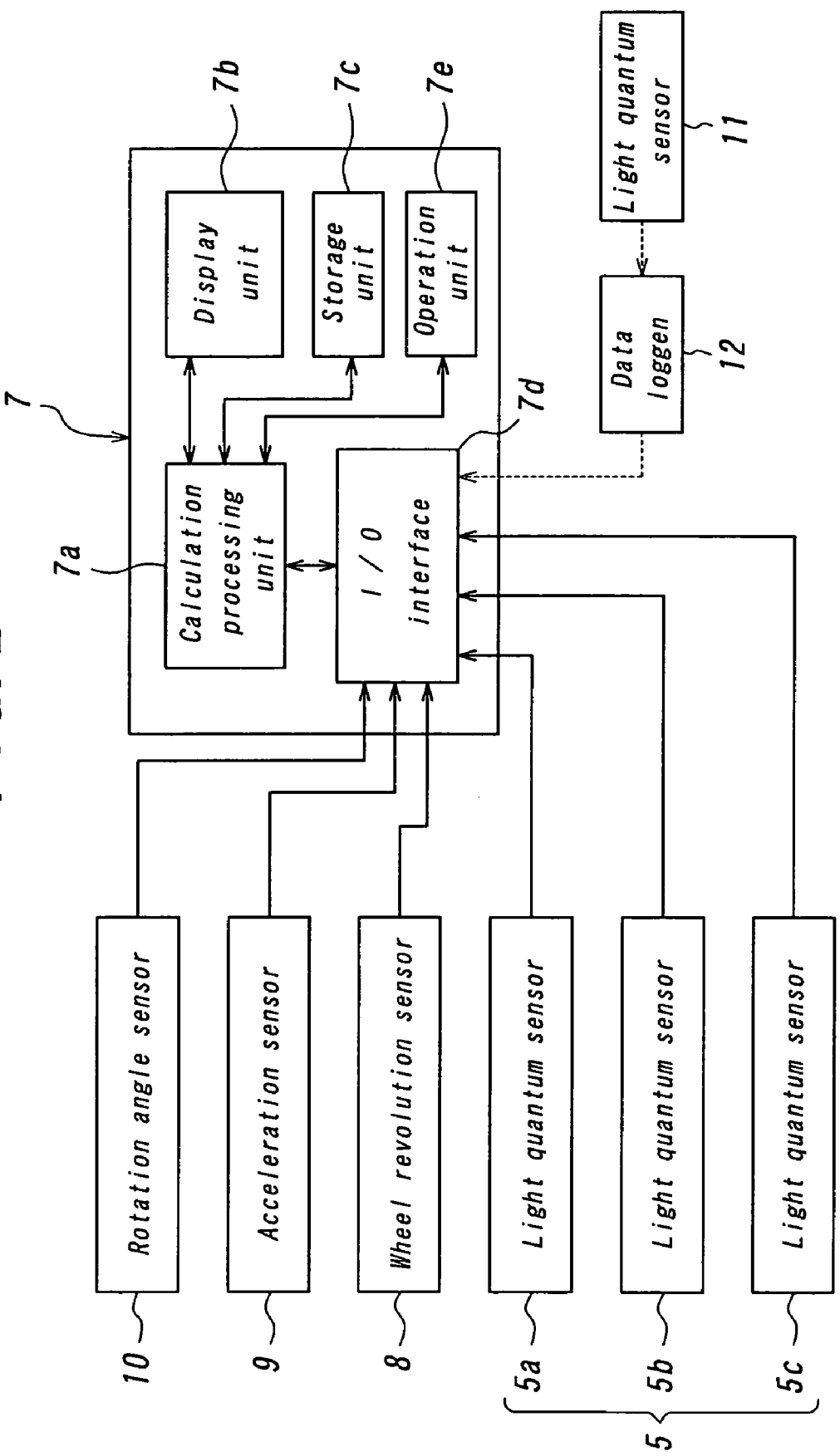

MOBILE MEASUREMENT SYSTEM OF PHOTOENVIRONMENT

BACKGROUND OF THE INVENTION

1. Field of the Invention

The present invention relates to a mobile measurement system of photoenvironment to measure a photoenvironment of the measuring object such as the inside of forest where the spatiotemporal alternation is large.

2. Description of Related Art

A result of the measurement of photoenvironment in forest is not only utilized as the characteristic of the forest such as a biomass and a quantity of foliage but also important to study a background of several lives in the forest. With the widespread of the concern for the preservation of carbon dioxide and the capability of photosynthesis of forest and the growing of the importance of the diversity of species, a demand of measurement system of photoenvironment is increasing. Furthermore, it is expected to use the measurement value of photoenvironment as indexical value for adequate control of the artificial forest.

Since the photoenvironment of forest differs according to locale and varies temporally at the same locale, the measurement of photoenvironment need to quickly carry out at multipoint. However, in the conventional measurement, to carry out the quick multipoint measurement, preliminary work such as the survey and the setting of quadrat (a frame that is used in "quadrat method") and measuring equipment at each measurement point needs to carry out quickly, and subsequently, the measurement needs to carry out immediately. Therefore the workloads of a measurement operator become too heavy.

SUMMARY OF THE INVENTION

The object of this invention is to solve the above-mentioned problem advantageously. A mobile measurement system of photoenvironment of this invention comprises a measuring equipment for measuring photoenvironment of measurement object, a barrow for moving measurement which measuring equipments are mounted and is driven by one wheel that contacts with a travel surface, said measuring equipment has one or more photosensor and a photodata recording device that records data output from said photosensor by detecting a light with a position and a direction of detection of said photosensor, said barrow has a rotation angle sensor which detects the rotation angles of the barrow around the mutually orthogonal three axes, a wheel revolution sensor which detects the revolution of the wheel and, a measurement position and direction calculating device that calculates the position and the direction of detection of said photosensors in accordance with an information of self-contained navigation from said rotation angle sensor and an information of moving distance from said wheel revolution sensor and transmit the result of the calculation to said photodata recording device.

In the mobile measurement system of photoenvironment of this invention, the barrow with the measuring equipments is driven by hand gilding of an operator or power from a source of power such as motor which is equipped with this barrow and is traveled on a travel surface such as a trackless cant in a forest, a punishing road, a construction field, an archaeological site and a narrow aisle at a disaster site by one wheel is contact with the travel surface like a ground surface, road surface and a floor face. In the traveling of the barrow for measurement, a rotation angle sensor detects the rotation angle of this barrow around the mutually orthogonal three axes which these axes are extended along such as the longitudinal direction, the transversal direction and the up-and-down direction of the barrow respectively, a wheel revolution sensor detects a revolution of the wheel, and the measurement position and direction calculating device calculate the position and the direction of detection of the photosensors and transmit the result of the calculation to said photodata recording device.

And, in the measurement by the measuring equipment which is mounted the barrow during drive or stop of the barrow accordingly, the photosensors detect light in the present position of the barrow and output the data, the photodata recording device records the data that is detected by the photosensors with the present position and the direction of detection of the photosensors. Such recorded data of light (photodata) may convert to relative illuminance within the forest or the like and utilize as significant data by comparing to the photodata out of the forest that is detected by another photosensors at the same time.

Therefore, according to the mobile measurement system of photoenvironment of this invention, a measurement of photoenvironment of the place such as forest where its photoenvironment varies temporally can carry out quickly by only moving the barrow without surveying and setting of a quadrat and a measuring equipment. So that the workload of a measurement operator will be drastically decreased on the preliminary work and the measurement to measure photoenvironment at multi measurement point.

Additionally, in the mobile measurement system of photoenvironment of this invention, directional vector of detection of each of plural photosensors of the equipment may be mutually orthogonal. Though there is insufficient to measure photoenvironment of the forest at only one direction of observation, the system of this invention can detect lights around the wide range of the direction of upward and circumference of the system by plural photosensors. Consequently, the measurement of photoenvironment in the forest can carry out more precisely.

Moreover, in the mobile measurement system of photoenvironment of this invention, a combination vector of said directional vectors of said photosensors may direct to upward in the specific coordinate system of said barrow. Thereby, the upper light can detect absolutely, so the measurement of photoenvironment in the forest can carry out more precisely.

Furthermore, in the mobile measurement system of photoenvironment of this invention, said equipment has three photosensors, a directional vector of detection of one of these sensors may be positioned on a plane that includes an axis of the specific coordinate system of said barrow that extends upwardly and another axis of said coordinate system that extending forwardly. Thereby, the upper and forward lights can detect absolutely, so the measurement of photoenvironment in the forest can carry out more precisely.

Furthermore, in the mobile measurement system of photoenvironment of this invention, at least one of said photosensors may light quantum sensor. Thereby, photodata that correspond to sensitivity of photosynthesis can obtain, so the measurement of physiological and biological photoenvironment of plants in the forest can carry out precisely.

Furthermore, in the mobile measurement system of photoenvironment of this invention, said measurement position and direction calculating device may comprise a moving pathway calculation unit which continuously calculate the position of said equipment and calculate a moving pathway of the barrow in accordance with the transition of the position of the equipment and, a moving pathway display unit that indicates the calculated said moving pathway on a screen. Thereby, an measurement operator in moving measurement and a researcher who analyzes measurement data in afterward can check the moving pathway of the barrow in the moving measurement on the screen, so that the operator always can carry out the multi-point measurement, the line measurement and the surface measurement with checking the current position to prevent the risk of distress, and the researcher will be able to carry out a detailed analysis of the data in reference to another data such as land features together.

Furthermore, in the mobile measurement system of photoenvironment of this invention, said barrow further comprising an acceleration sensor which detects the acceleration of the barrow that directed to the mutually orthogonal three axes and, said measurement position and direction calculating device uses information of self-contained navigation from said acceleration sensor to calculate the position and the direction of said photosensors. So that, since the acceleration sensor detects the accelerations of the barrow such as in the directions of the mutually orthogonal three axes which these axes are extended along such as the longitudinal direction, the transversal direction and the up-and-down direction of the barrow respectively, and the measurement position and direction calculating device uses these accelerations to calculate the each position and the direction of the detection of said photosensors, if the additional acceleration of the barrow is occurred by an impact or the like, an error from the additional acceleration at the calculation of the each position and the direction of the detection of the photosensors will be reduced.

Moreover, according to the measurement method of this invention, the workload of a measurement operator will be drastically decreased on the preliminary work and the measurement to measure photoenvironment at multi measurement point, and the measurement of photoenvironment in the forest can carry out precisely.

BRIEF DESCRIPTION OF THE DRAWINGS

FIG. 2 is a block diagram of the composition of the measuring equipment that is mounted on the mobile measurement system of photoenvironment in forest of the embodiment of this invention.

DETAILED DESCRIPTION OF THE PREFERRED EMBODIMENT

Figure 1:
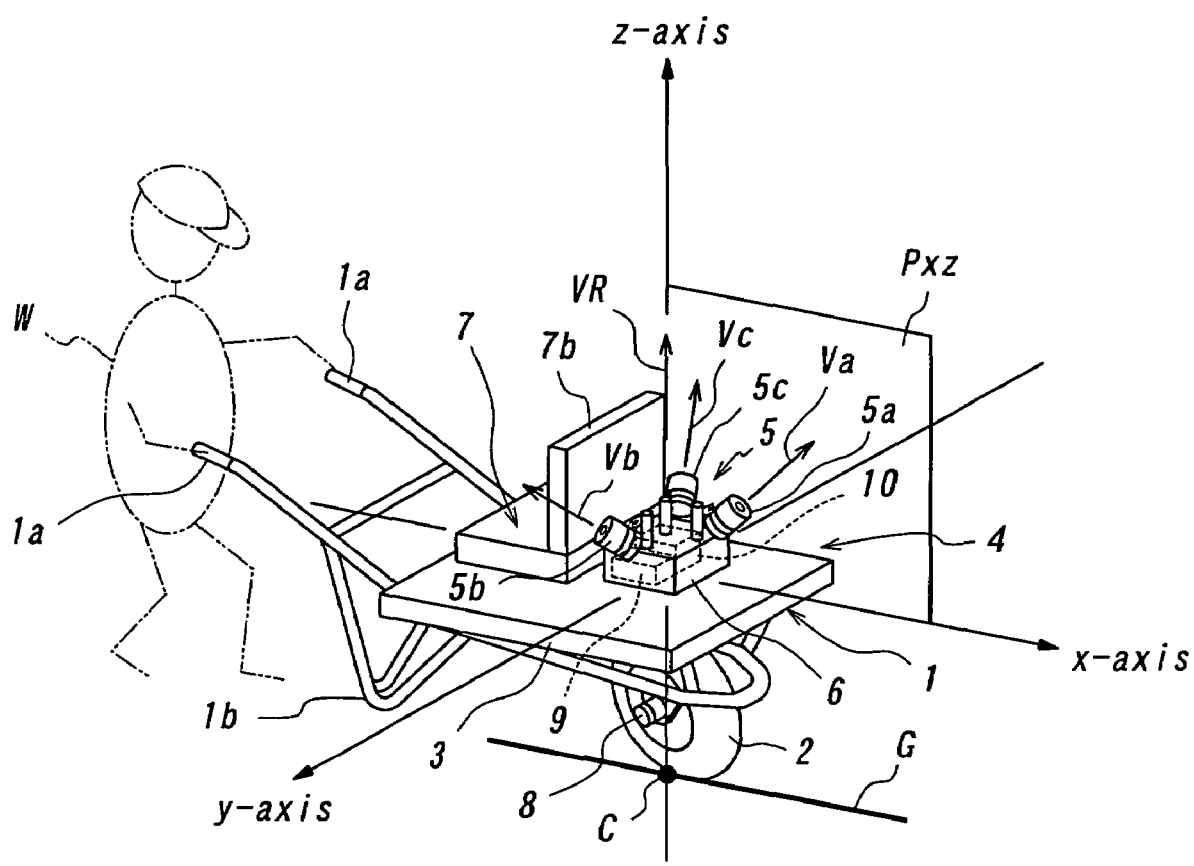
FIG. 1 is schematically perspective view of the appearance of the mobile measurement system of photoenvironment in forest as one embodiment of the mobile measurement system of photoenvironment of this invention.

The embodiment according to this invention will be explained, by way of example, with reference to the accompanying drawings, in which FIG. 1 is schematically perspective view of the appearance of the mobile measurement system of photoenvironment in forest as one embodiment of the mobile measurement system of photoenvironment of this invention and FIG. 2 is a block diagram of the composition of the measuring equipment that is mounted on the mobile measurement system of photoenvironment in forest of the embodiment of this invention.

As shown in FIG. 1, the mobile measurement system of photoenvironment in forest of this embodiment comprises a mobile barrow 4 which has a frame 1 with a handle for hand gilding and two stems for stay (there only shows one of the stems in the drawing), a wheel 2 which is rotatably supported around the axis at the underneath of frame 1 and a top plate 3 which is mounted on frame 1, this barrow 4 is driven by hand gilding drive of a measurement operator W and by means of the wheel 2 which contact on the grounding point C of the ground level G as the driving surface. The barrow 4 further comprises three light quantum sensor 5a, 5b, 5c as components of an measuring equipment 5, an angle and acceleration sensor unit 6, a commercially available laptop computer 7 as a photodata storage device and a measurement position and direction calculating device, and a portable power supply (not shown), a slit floodlight 5b which is one of a component of the measuring equipment 5 and is mounted on the top of the column 1c which is made from aluminum and set up at the backward of flame 1 with about 120 cm length each of which are mounted to the top plate 3, and a wheel revolution sensor 8 which is mounted on the frame 1 and detects the revolution of wheel 2. The angle and acceleration sensor unit 6 contains an acceleration sensor 9 which detects the acceleration of the barrow 4 in the directions of mutually orthogonal three axes, that is, x-axis, y-axis and z-axis respectively, and a rotation angle sensor 10 which detects the rotation angle of the barrow 4 around the mutually orthogonal three axes, that is, x-axis, y-axis and z-axis respectively.

The barrow 4 is made from a commercially available two-wheel barrow (for example, CC3-2FA made by Showa Bridge Sales Co., Ltd.) by removing its original two wheels which are line up on the axis which is extended to the transversal direction, instead one wheel 2 is mounted the intermediate position between where the original two wheels were mounted, and removing its original plastic body, alternatively the flat top plate 3 of plywood is mounted on the frame 1 as this plate is approximately horizontal when a person stands and keep the handle 1a holding. The wheel revolution sensor 8 is consisted from two potentiometers (for example, CPP-45RBN 22.7 kΩ made by NIDEC COPAL ELECTRONICS Corp.) which are placed on the axle of the wheel 2 serially. Since this potentiometer has a dead angle that cannot detect its angle, so these potentiometers are positioned to locate its each dead angle are staggered at 180° each other to prevent these potentiometers are in dead angle at the same time.

The angle and acceleration sensor unit 6 is consisted from commercially available products (for example, three axes angle sensor GU-3024 made by Datatec Co., Ltd.), as shown in FIG. 1, the acceleration sensor 9 is positioned to make its x-axis is extended to parallel with the x-axis of specific coordinate system of the barrow 4 which is extended along the longitudinal direction of the barrow 4 and is parallel to the surface of the top plate 3, and its y-axis is extended to parallel with the y-axis of specific coordinate system of the barrow 4 which is extended along the transversal direction of the barrow 4 and is parallel to the surface of the top plate 3, and its z-axis is extended to parallel with the z-axis of specific coordinate system of the barrow 4 which is extended along the up-and-down direction of the barrow 4 and is orthogonal to the surface of the top plate 3, and the rotation angle sensor 10 which is consisted by a gyro that is housed in the sensor is positioned to make its x-axis is extended along the longitudinal direction of the barrow 4 to be identical with the x-axis of specific coordinate system of the barrow 4, and its y-axis is extended along the transversal direction of the barrow 1 to be identical with the y-axis of specific coordinate system of the barrow 4, and its z-axis is extended to be orthogonal with the axle of the wheel 2 at the center of the wheel and to be identical with the z-axis of specific coordinate system of the barrow 4 at the up-and-down direction of the barrow 4. The portable power supply which is not shown in the drawings is a built-in battery inverter (for example, a portable power supply Z-130 made by SWALLOW ELECTRIC Co., Ltd.) which out put AC100V power to the angle and acceleration sensor 6 and the personal computer 7 as a power supply.

Additionally, in this embodiment, the data of three-dimensional acceleration and the data of three-dimensional angle that are respectively detected by the acceleration sensor 9 and the rotation angle sensor 10 in the angle and acceleration sensor unit 6 are input to the laptop computer 7 through RS232C cable. Each terminal for power source of two potentiometers which consists the wheel revolution sensor 8 are connected together in parallel to make a parallel circuit, and fixed resistor of 20 kΩ is connected the circuit in serial. A power of about 6V by four size D batteries that are connected in serial is impressed to whole of the circuit and the resistor, the three voltage value, that is, the voltage of both ends of the parallel circuit (V0) which is consisted by two potentiometers and each voltage of the terminals (variable resistance intermediate terminal) of both of each potentiometers (V1, V2) are input independently to the laptop computer 7 via A/D converter circuit card (for example, REX-5054U made by RATOC Systems Inc.) which is inserted in the card slot of the laptop computer 7.

Moreover, the light quantum sensors 5a–5c of the equipment 5 are construct from commercially available product (for example, quantum sensor LI-190SB made by LI-COR, Inc.). In this embodiment, as shown in FIG. 1, these sensors are mounted on the top plate 3 by columns that are mounted on the housing of the angle and acceleration sensor unit 6 each other as a combination vector VR of the central optic axis vectors Va, Vb, Vc that are of each light quantum sensors 5a–5c upwards in line with the z-axis of the specific coordinate system of the barrow 4, and the central optic axis vector Va that is one of the sensors 5a is set to the direction that the vector Va is located in the ideal plane Pxz that includes the x- and y-axis of the specific coordinate system, and the other central optic axis vectors Vb, Vc that are of the other light quantum sensor 5b and 5c are mutually orthogonal and both of the vector are orthogonal to the vector Va to measure photoenvironment in the forest. The analog signals as photodata that is output from these sensors 5a–5c by detecting the light quantum are amplified by not shown amplifier, and subsequently, these signals are input to the laptop computer 7 via IEEE1394 interface card (for example, REX-CBFW1-L made by RATOC Systems Inc.) that is inserted in other card slot of the computer 7.

Furthermore, as shown in FIG. 2, the laptop computer 7 comprises a calculation processing unit 7a having a central processing unit (CPU), a display unit 7b with a liquid crystal display, a storage unit 7c with some storage device such as a memory and a hard disk drive, I/O interface 7d with the above-mentioned interface card in the card slot, and an operation unit with some operation device such as keyboard. Thereby, the computer 7 processes the measurement data from the above-mentioned measuring equipments in accordance with a program which is previously stored in the memory as described later, then output the result of the data processing on the screen of the display unit 7b together with the measurement data from the measuring equipment 5 and stores the data in the storage unit 7c, furthermore, calculate and output the three-dimensional structure of the plant community as the object of the measurement from the above-mentioned data. In addition, the output voltage V1, V2 of the two potentiometers of the wheel revolution sensor 8 are converted to the rotation angle of the wheel 2 to select the output value from V1/V0 or V2/V0 which is not a value of its dead angle.

In the moving measurement of photoenvironment of forest by using the mobile measurement system of photoenvironment in forest of this embodiment, at first, the laptop computer 7 is turn on and the moving measurement program activate, and the angle and acceleration sensor unit 6 is turn on and the acceleration sensor 9 and the rotation angle sensor 10 activate. The computer 7 executes the program and utilizes the position of x-axis, y-axis and z-axis of the sensor unit 6 at the activation as a fundamental coordinate system in the data processing.

Subsequently, as the measurement operator W drives the barrow 4 by hand gilding, the computer 7 calculates the moving distance of the barrow 4 in real time from the rotation angle of the wheel 2 which is converted from the output data of the potentiometer of the wheel revolution sensor 8 and the outer diameter of the wheel 2, after that the computer 7 calculates the current position of the sensors 5a–5c of the measuring equipment 5 by decomposing the moving distance to the each components in the directions of x-axis, y-axis and z-axis of the fundamental coordinate system with the use of the three-dimensional direction angle of the posture of the barrow 4 from the output data from the rotation angle sensor 10, moreover, the computer 7 calculates the present position and the zenithal angle and the azimuthal angle of the direction of the central optic axis vectors Va, Vb, Vc, that is, the present direction of the measurement of the light quantum sensors 5a–5c by using the three-dimensional angle of the posture of the barrow which are obtained from the output data from the rotation angle sensor 10, then, the computer 7 stores these calculated data in the hard disk drive of the storage unit 7c.

Furthermore, when the operator is driving the barrow 4 or when the operator stops the barrow 4 accordingly, the computer 7 processes the photodata of oblique upwardly that is detected and output by the each light quantum sensors 5a–5c of the equipment 5 at the directions of the forward and oblique from behind on the either side and, subsequently, save the photodata in the hard disk drive of the storage unit 7c associate with the present position and the present direction of measurement of the each light quantum sensors 5a–5c as the result of the measurement.

Since it cannot be expected that the operator will be able to drive the barrow 4 by hand gilding with keeping up the top plate 3 with parallel to the inclination of the ground level G of the longitudinal direction of the barrow 4, it is necessary to be previously checked the tilt value of the top plate 3 on the ground level G of the flat land when the operator holds the handle 1a of the barrow 4 with respect to different plural operators and input each of the tilt value to the computer 7. Thereby, the computer 7 will compensate the rotation angle of the barrow that is output from the rotation angle sensor 10 to the amount of the each tilt value.

Moreover, if the revolution status of the wheel 2 which based on the output data from the wheel revolution sensor 8 does not correspond to the generation status of the acceleration which based on the output data of the acceleration sensor 9 (for example, in the case that an acceleration for longitudinal direction is detected although the wheel is not revolving), it is presumed that the acceleration of the barrow 4 is generated by impact or the like and the wheel 2 does not revolve corresponding to the amount of the actual moving distance, so that the computer 7 will perform integration of the acceleration that is detected by the acceleration sensor 9 in two times to obtain the moving distance of the wheel 2 at the direction of the acceleration, and compensate the moving distance that is previously calculated from the rotation angle of the wheel 2 according to the distance which is calculated from the detected acceleration.

Furthermore, the computer 7 calculate the moving trajectory of the barrow 4 from the transition of the present position of the measuring equipment 5, and display the moving trajectory of the barrow 4 in a map or a plan view on the liquid crystal display of the display unit 7b, in addition, the result of the measurement of the equipment 5 is displayed on the liquid crystal display of the display unit 7b with the above-described moving trajectory or by switching the display image.

Additionally, when the moving measurement of the mobile measurement system of photoenvironment is terminated, executing the program of the photoenvironment analysis, the laptop computer 7 reads the position and the direction of measurement of the light quantum sensors 5a–5c in the measurement and the photodata that is detected by the sensors and the another photodata that is detected and output by the another light quantum sensor 11 (for example, quantum sensor LI-190SB, the same sensor as the sensors 5a–5c) that is additionally located outside the forest as the central optic axis vector is directed to vertically upward direction and recorded by the data logger (recorder) 12 (for example, data logger LI-1400 made by LI-COR, Inc.) with time data as the value of the photo measurement outside the forest. Subsequently, the computer 7 calculates the photointensity of projection to the horizontal plane of the absolute coordinate system from the photodata of the sensors 5a–5c, convert the photointensity to the relative illuminance by dividing the photointensity by the value of the photo measurement outside the forest, and out put in the form of the image on the liquid crystal display of the display unit 7b and the storage data of the hard disk drive of the storage unit 7c as the photoenvironment data of the forest.

Therefore, according to the mobile measurement system of photoenvironment of the embodiment of this invention, a measurement of photoenvironment of the place such as forest where its photoenvironment varies temporally can carry out quickly by only moving the barrow without surveying and setting of a quadrat and a measuring equipment. So that the workload of a measurement operator will be drastically decreased on the preliminary work and the measurement to measure photoenvironment at multi measurement point.

Though there is insufficient to measure photoenvironment of the forest at only one direction of observation, the system of the embodiment of this invention can detect lights around the wide range of the direction of upward and circumference of the system by three light quantum sensors 5a–5c and, consequently, the measurement of photoenvironment in the forest can carry out more precisely because the central optic axis (directional) vectors Va–Vc of the sensors 5a–5c of the equipment 5 are mutually orthogonal.

Moreover, according to the mobile measurement system of photoenvironment of the embodiment of this invention, a combination vector VR of the central optic axis (directional) vectors Va–Vc of the sensors 5a–5c direct to upward in the specific coordinate system of the barrow 4, so the upper light can detect absolutely, so the measurement of photoenvironment in the forest can carry out more precisely.

Furthermore, according to the mobile measurement system of photoenvironment of the embodiment of this invention, the photosensor of the equipment 5 is three light quantum sensors 5a–5c, and a directional vector of detection Va of one of these sensors is positioned on a plane Pxz that includes an axis of the specific coordinate system of said barrow 4 that extends upwardly and another axis of said coordinate system that extending forwardly, so the upper and forward lights can detect absolutely, so the measurement of photoenvironment in the forest can carry out more precisely.

Furthermore, according to the mobile measurement system of photoenvironment of the embodiment of this invention, all of three photosensors of the equipment 5 are light quantum sensor 5a–5c, so the photodata that correspond to sensitivity of photosynthesis can obtain, so the measurement of physiological and biological photoenvironment of plants in the forest can carry out precisely.

Furthermore, according to the mobile measurement system of photoenvironment of the embodiment of this invention, the computer 7, as a measurement position and direction calculating device, performs as a moving pathway calculation unit which continuously calculate the position of the barrow 4 and calculate a moving pathway of the barrow 4 in accordance with the transition of the position of the equipment and as a moving pathway display unit that indicates the calculated said moving pathway on a screen. Thereby, an measurement operator in moving measurement and a researcher who analyzes measurement data in afterward can check the moving pathway of the barrow 4 in the moving measurement on the screen, so that the operator always can carry out the multi-point measurement, the line measurement and the surface measurement with checking the current position to prevent the risk of distress, and the researcher will be able to carry out a detailed analysis of the data in reference to another data such as land features together.

Although this invention is explained above in accordance with the embodiment, this invention is not limited by the embodiment. For example, the mobile measurement system of photoenvironment of this invention is available for the measurement of photoenvironment in the field such as a forest area, a construction field, an archaeological site and a disaster site, so that a quick and accurate moving measurement of such measuring object can easily carry out.

Additionally, in this invention, the sensor of the measuring equipment 5 is not limited to the light quantum sensor of the embodiment but it can be changed to another sensor such as an insolation sensor or illuminant sensor or the combination of these sensors accordingly.

Moreover, in this invention, the number of photosensor of the equipment 5 may one or two, or over four if required by combining plural kind of different sensor. Additionally, when the barrow of this invention is used on the relatively flat and nonskid travel surface such as pavement, the acceleration sensor that detects the acceleration of the barrow in the directions of mutually orthogonal three axes may be omitted.

Furthermore, the barrow of this invention may be mounted the source of the power such as motor to aid the hand gilding by the operator or moving itself as the operator holds the handle. Furthermore, the barrow of this invention is not offhand gilding, but also driving by an animal such as horse or donkey by holding the member of the barrow like handle with the use of habiliment.

Consequently, according to the mobile measurement system of photoenvironment of this invention, it can obtain such following useful data.

(1) Planar Distribution Map of Relative Illuminance

If the moving measurement carries out as covering all of inside the forest and using the positional data of the photosensors that is obtained from the measurement by the barrow, a planar distribution map of relative illuminance of the forest can be plotted.

(2) Distribution Map of Sunfleck Inside Forest

The sunlight that reaches to the bottom of the forest through the gaps between foliages so called "sunfleck" in biology is noted because it has an effect on the growth and development of juvenile tree. This sunfleck has an incident angle correspond to altitude of the Sun. According to the mobile measurement system of photoenvironment of this invention, for example, capturing this sunfleck by the abovementioned three photosensor that these sensors direct to the different direction respectively, the spatial distribution map of sunfleck can visualize by using the positional data of the photosensors that is obtained from the measurement by the barrow.

The invention claimed is:

1. A mobile measurement system of a photoenvironment, comprising:
    measuring equipment for measuring the photoenvironment of a measurement object,
    a barrow for moving measurement on which the measuring equipment is mounted and which is driven by one wheel that contacts a travel surface,
    the measuring equipment having one or more photosensors and a photodata recording device that records data output from said one or more photosensors by detecting light with a position and a direction of detection of said one or more photosensors,
    the barrow having a rotation angle sensor which detects the rotation angles of the barrow around the mutually orthogonal three axes, a wheel revolution sensor which detects the revolution of the wheel, and a measurement position and direction calculating device that calculates the position and the direction of detection of said one or more photosensors in accordance with self-contained information of navigation from said rotation angle sensor and information of distance moved from said wheel revolution sensor, and transmits the results of the calculation to said photodata recording device.

2. A mobile measurement system of a photoenvironment according to claim 1, wherein,
    a directional vector of detection of each of said one or more photosensors of the equipment are mutually orthogonal.

3. A mobile measurement system of a photoenvironment according to claim 1, wherein,
    a combination vector of said directional vectors of said one or more photosensors is directed upwards in the specific coordinate system of said barrow.

4. A mobile measurement system of a photoenvironment according to claim 1, wherein,
    the measuring equipment has three photosensors,
    a directional vector of detection of one of the three photosensors is positioned on a plane that includes an axis of the specific coordinate system of said barrow that extends upwards and another axis of said coordinate system that extends forwards.

5. A mobile measurement system of a photoenvironment according to claim 1, wherein,
    at least one of said photosensors is light quantum sensor.

6. A mobile measurement system of a photoenvironment according to claim 1, wherein,
    the measurement position and direction calculating device comprises:
    a moving pathway calculation unit which continuously calculates the position of said measuring equipment and calculates a moving pathway of the barrow in accordance with the transition of the position of the measuring equipment, and
    a moving pathway display unit that indicates the calculated moving pathway on a display.

7. A mobile measurement system of a photoenvironment according to claim 1, wherein,
    the barrow further includes an acceleration sensor which detects the acceleration of the barrow along the mutually orthogonal three axes, and
    the measurement position and direction calculating device uses information of self-contained navigation from said acceleration sensor to calculate the position and the direction of said one or more photosensors.

8. A measuring method of a photoenvironment with a mobile measurement system, the method comprising:
    mounting the measuring equipment on a barrow which is driven by one wheel that contacts a travel surface and which has a rotation angle sensor which detects the rotation angles of the barrow around the mutually orthogonal three axes, a wheel revolution sensor which detects the revolution of the wheel, and a measurement position and direction calculating device;
    detecting light with the measuring equipment, said measuring equipment having one or more photosensors;
    recording data output from said one or more photosensors;
    calculating the position and the direction of detection of said one or more photosensors in accordance with self contained information of navigation from said rotation angle sensor and information of distance moved from said wheel revolution sensor; and
    transmitting the results of the calculation to said photodata recording device.

9. A mobile measurement system of a photoenvironment, comprising:
    means for measuring light levels;
    means for maneuvering the light-measuring means in the photoenvironment on a surface which may vary;
    means for recording the measured light levels;
    means for determining the three-dimensional position of each location at which light level is measured;
    means for recording said 3-dimensional position of each light measurement;
    means for determining the direction of detection of each light measurement; and
    means for recording said direction of detection of each light measurement.

* * * * *